United States Patent
Zhu et al.

(10) Patent No.: US 10,846,566 B2
(45) Date of Patent: Nov. 24, 2020

(54) METHOD AND SYSTEM FOR MULTI-SCALE CELL IMAGE SEGMENTATION USING MULTIPLE PARALLEL CONVOLUTIONAL NEURAL NETWORKS

(71) Applicant: KONICA MINOLTA LABORATORY U.S.A., INC., San Mateo, CA (US)

(72) Inventors: Jingwen Zhu, Foster City, CA (US); Yongmian Zhang, Union City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 16/315,541

(22) PCT Filed: Aug. 9, 2017

(86) PCT No.: PCT/US2017/046151
§ 371 (c)(1),
(2) Date: Jan. 4, 2019

(87) PCT Pub. No.: WO2018/052586
PCT Pub. Date: Mar. 22, 2018

(65) Prior Publication Data
US 2019/0236411 A1    Aug. 1, 2019

Related U.S. Application Data

(60) Provisional application No. 62/394,691, filed on Sep. 14, 2016.

(51) Int. Cl.
*G06K 9/62*    (2006.01)
*G06N 3/04*    (2006.01)
(Continued)

(52) U.S. Cl.
CPC ......... *G06K 9/6256* (2013.01); *G06K 9/4628* (2013.01); *G06K 9/6268* (2013.01);
(Continued)

(58) Field of Classification Search
None
See application file for complete search history.

(56) References Cited

U.S. PATENT DOCUMENTS 5,324,532 A     6/1994  Stute et al.
6,324,532 B1 *  11/2001  Spence ............... G06K 9/3241
                                                      706/27

(Continued)

OTHER PUBLICATIONS

Noh et al. "Learning deconvolution network for semantic segmentation", CVPR 2015, May 17, 2015, arXiv:1505.04366v1.
(Continued)

*Primary Examiner* — Delomia L Gilliard
(74) *Attorney, Agent, or Firm* — Chen Yoshimura LLP

(57) ABSTRACT

An artificial neural network system for image classification, formed of multiple independent individual convolutional neural networks (CNNs), each CNN being configured to process an input image patch to calculate a classification for the center pixel of the patch. The multiple CNNs have different receptive field of views for processing image patches of different sizes centered at the same pixel. A final classification for the center pixel is calculated by combining the classification results from the multiple CNNs. An image patch generator is provided to generate the multiple input image patches of different sizes by cropping them from the original input image. The multiple CNNs have similar configurations, and when training the artificial neural network system, one CNN is trained first, and the learned parameters are transferred to another CNN as initial parameters and the other CNN is further trained. The classification (Continued)

includes three classes, namely background, foreground, and edge.

15 Claims, 5 Drawing Sheets

(51) Int. Cl.
  *G06K 9/46* (2006.01)
  *G06T 3/40* (2006.01)
(52) U.S. Cl.
  CPC ......... *G06K 9/6274* (2013.01); *G06K 9/6292* (2013.01); *G06N 3/0454* (2013.01); *G06T 3/4046* (2013.01)

(56) References Cited

U.S. PATENT DOCUMENTS

| | | | |
|---|---|---|---|
| 9,436,895 B1* | 9/2016 | Jones | G06N 3/0454 |
| 2006/0204053 A1 | 9/2006 | Mori et al. | |
| 2014/0085501 A1* | 3/2014 | Tran | G06F 3/005 |
| | | | 348/222.1 |
| 2016/0104053 A1 | 4/2016 | Yin et al. | |
| 2016/0148079 A1* | 5/2016 | Shen | G06N 3/0454 |
| | | | 382/157 |
| 2016/0196672 A1 | 7/2016 | Chertok et al. | |

OTHER PUBLICATIONS

Chen et al., "DCAN: Deep contour-aware networks for accurate gland segmentation", CVPR 2016, Apr. 10, 2016, arXiv:1604.02677v1.
He et al., "Spatial pyramid pooling in deep convolutional networks for visual recognition", PAMI 2015, Apr. 23, 2015, arXiv:1406.4729v4.
Neverova et al., "Multi-scale deep learning for gesture detection and localization", ECCV, 2014, Springer.
Simonyan et al., "Very Deep Convolutional Networks for Large-Scale Image Recognition", ICLR 2015, Apr. 10, 2015, arXiv:1409.1556v6.
Yu et al., "Multi-Scale Context Aggregation by Dilated Convolutions", ICLR 2016, Apr. 30, 2016, arXiv:1511.07122v3.
Li et al., "Highly Efficient Forward and Backward Propagation of Convolutional Neural Networks for Pixelwise Classification", Dec. 16, 2014, arxiv:1412.4526v2.
International Search Report in the parent PCT application No. PCT/US2017/046151, dated Oct. 19, 2017.
Written Opinion in the parent PCT application No. PCT/US2017/046151, dated Oct. 19, 2017.

* cited by examiner

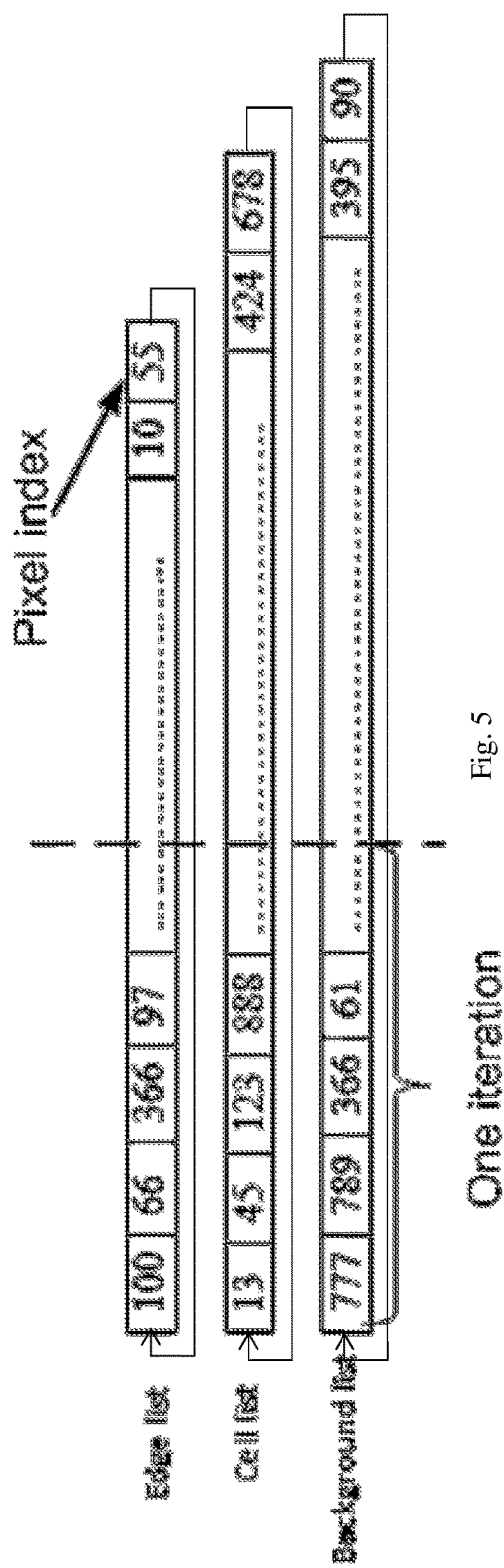
Fig. 5
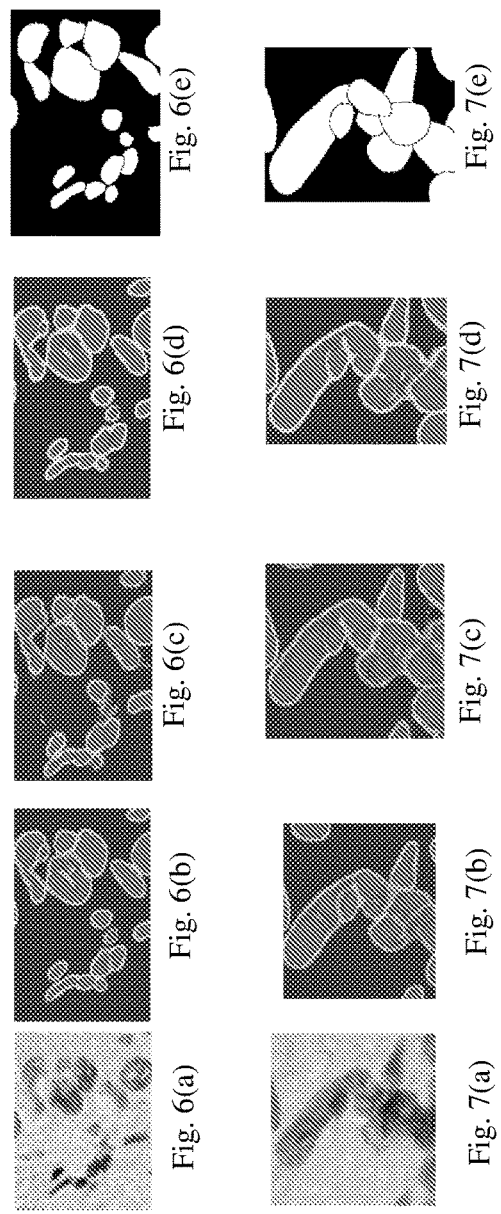
Fig. 6(a) Fig. 6(b) Fig. 6(c) Fig. 6(d) Fig. 6(e)
Fig. 7(a) Fig. 7(b) Fig. 7(c) Fig. 7(d) Fig. 7(e)

METHOD AND SYSTEM FOR MULTI-SCALE CELL IMAGE SEGMENTATION USING MULTIPLE PARALLEL CONVOLUTIONAL NEURAL NETWORKS

BACKGROUND OF THE INVENTION

Field of the Invention

This invention relates to artificial neural network technology, and in particular, it relates to an improved convolutional neural network (CNN).

Description of Related Art

Artificial neural networks are used in various fields such as machine leaning, and can perform a wide range of tasks such as computer vision, speech recognition, etc. An artificial neural network is formed of interconnected layers of nodes (neurons), where each neuron has an activation function which converts the weighted input from other neurons connected with it into its output (activation). In a learning process, training data are fed into to the artificial neural network and the adaptive weights of the interconnections are updated through the leaning process. After learning, data can be inputted to the network to generate results (referred to as prediction).

A convolutional neural network (CNN) is a type of feed-forward artificial neural networks; it is useful particularly in image recognition. Inspired by the structure of the animal visual cortex, a characteristic of CNNs is that each neuron in a convolutional layer is only connected to a relatively small number of neurons of the previous layer. A CNN typically includes one or more convolutional layers, pooling layers, ReLU (Rectified Linear Unit) layers, fully connected layers, and loss layers. In a convolutional layer, the core building block of CNNs, each neuron computes a dot product of a 3D filter (also referred to as kernel) with a small region of neurons of the previous layer (referred to as the receptive field); in other words, the filter is convolved across the previous layer to generate an activation map. This contributes to the translational invariance of CNNs. In addition to a height and a width, each convolutional layer has a depth, corresponding to the number of filters in the layer, each filter producing an activation map (referred to as a slice of the convolutional layer). A pooling layer performs pooling, a form of down-sampling, by pooling a group of neurons of the previous layer into one neuron of the pooling layer. A widely used pooling method is max pooling, i.e. taking the maximum value of each input group of neurons as the pooled value; another pooling method is average pooling, i.e. taking the average of each input group of neurons as the pooled value. The general characteristics, architecture, configuration, training methods, etc. of CNNs are well described in the literature. Various specific CNNs models have been described as well.

In quantitative analysis of pathological images, quantification is usually carried out on single cells before grading them. Traditional machine learning methods fail to achieve good performance in cell segmentation due to large variations in image stain, inhomogeneous cell regions (e.g., the interior of cells may not be a uniform color or grey shade, or may even have holes etc.), densely clustered cells, etc. Recently deep learning approaches have achieved immense success in high level computer vision tasks, which motivates people to apply it to pixelwise classification problems (i.e. predicting the class for every pixel of an image, as opposed to classifying the whole image or objects within the image). However, commonly used approaches like patch-by-patch scanning method or up-sampling method do not achieve satisfactory result in cell images. This is partly due to the fact that cell images usually contain cells at different scale levels (i.e. different cell sizes) in a single image, which makes performance low when using network model with a single receptive field of view.

A prior approach for handling images with objects in multiple scales uses a deep deconvolution network, which is composed of different levels of deconvolution and up-pooling layers. See H. Noh et al. "Learning deconvolution network for semantic segmentation", CVPR 2015. However, deconvolution usually blurs object contour, which makes it difficult to separate the touching cells, especially when all cell regions are in a relatively homogenous color or gray level. Other papers have also discussed issues of objects in multiple scales. For example, H. Chen et al., DCAN: Deep contour-aware networks for accurate gland segmentation, CVPR 2016, uses a deconvolution method to address this issue. K. He et al., Spatial pyramid pooling in deep convolutional networks for visual recognition, PAMI 2015, uses spatial pyramid pooling to address this issue. N. Neverova et al., Multi-scale deep learning for gesture detection and localization, ECCV, 2014, employs a multi-modal convolutional neural network for classification of so-called dynamic poses of varying durations (i.e. temporal scales), which operates at three temporal scales corresponding to dynamic poses of three different durations.

US Pat. Appl. Pub. No. Patent 2016/0104053A1 describes a facial recognition system which uses a hierarchical inter-linked multi-scale convolutional neural network to identify locations and footprints of components of a face image with multiple levels of image patches from different resolution images of the face image. In this system, the different convolutional neural networks are interlinked with each other. The input patches are multiple images of different resolutions down sampled from original image.

SUMMARY

Embodiments of the present invention provides a multi-scale convolutional neural network (CNN) system for segmenting cells with varying sizes and shapes by using different scales of networks and fusing the results from multiple networks at the final output. The system can fully take advantage of GPU (graphics processing unit) cluster hardware technology.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides an artificial neural network system implemented on a computer for image classification, which includes: N individual convolutional neural networks (CNNs), N being a natural number greater than or equal to two, each individual CNN having a plurality of layers of neurons stacked sequentially, including at least a plurality of convolutional layers and a plurality of pooling layers, each convolutional layer performing convolution operations to convolve a number of filters across its previous layer, each pooling layer performing pooling operations on its previous layer, wherein each of the N individual CNNs is configured to process an input image patch to calculate a classification result representing a classification of a center pixel located at a center of the input image patch, each of the N individual CNNs defining a receptive field of view (FOV) which is equal to a size of input image patches to be processed by the individual CNN, the FOV of different individual CNNs being different from each other; a scale level image patch generator for generating N input image patches by cropping the image patches from an input image, the N image patches being centered at a common center pixel of the input image and having respective sizes equal to the FOV of the N individual CNNs, wherein each of the N individual CNNs is coupled to the scale level image patch generator and processes a respective one of the N input image patches to calculate a respective classification result for the center pixel; and a fuser module coupled to the N individual CNNs, for calculating a final classification result for the center pixel by combining the classification results from the N individual CNNs.

In another aspect, the present invention provides an image classification method using an artificial neural network system implemented on a computer, which includes: providing N individual convolutional neural networks (CNNs), N being a natural number greater than or equal to two, each individual CNN having a plurality of layers of neurons stacked sequentially, including at least a plurality of convolutional layers and a plurality of pooling layers, each convolutional layer performing convolution operations to convolve a number of filters across its previous layer, each pooling layer performing pooling operations on its previous layer, each of the N individual CNNs defining a receptive field of view (FOV), the FOV of different individual CNNs being different from each other; for each pixel X of an input image: cropping N image patches from the input image centered at the pixel X, each of the N image patches having a size equal to the FOV of a corresponding one of the N individual CNNs; inputting the N image patches respectively into the corresponding N individual CNNs; each individual CNN processing the respective inputted image patch to calculate a respective classification result for the pixel X; and calculating a final classification result for the pixel X by combining the classification results from the N individual CNNs.

In another aspect, the present invention provides a method of training an artificial neural network system for image classification, the artificial neural network system being implemented on a computer and including N individual convolutional neural networks (CNNs), N being a natural number greater than or equal to two, each individual CNN having a plurality of layers of neurons stacked sequentially, including at least a plurality of convolutional layers and a plurality of pooling layers, each convolutional layer performing convolution operations to convolve a number of filters across its previous layer, each pooling layer performing pooling operations on its previous layer, each individual CNN has a first portion, wherein the first portions of the N individual CNNs have identical numbers and identical arrangements of the convolutional layers and the pooling layers, wherein the corresponding layers in the first portions of different individual CNNs have different heights and widths and have identical depths, and wherein the filters in corresponding convolutional layers in the first portions of the different individual CNNs have identical heights and widths, the training method including: training a first CNN of the N individual CNNs using labeled training images to obtain a set of parameters for the first CNN, the set of parameters including a subset of parameters for the first portion of the first CNN; transferring the subset of parameters for the first portion of the first CNN to the first portion of a second CNN of the N individual CNNs; and training the second CNN using labeled training images and using the transferred subset of parameters as initial parameters, to obtain a set of parameters for the second CNN.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIG. 5 schematically illustrates exemplary pixel lists for different classes used to prepare training data for training a CNN according to an embodiment of the present invention.

FIGS. 6(a)-6(e), 7(a)-7(e) and 8 show examples of cell image classification results obtained by a multi-scale CNN system constructed according to an embodiment of the present invention.

DETAILED DESCRIPTION OF PREFERRED EMBODIMENTS

Embodiments of the present invention provide an improved convolutional neural network (CNN) system, referred to as a multi-scale CNN, which is effective for cell recognition in cell images captured by a microscope. The technology may be used to perform quantitative analysis of the images.

Generally speaking, the task of cell recognition (also referred to as cell segmentation) is to classify parts of the input image as cell or background. In embodiments of the present invention, each pixel of the input cell image is classified into one of three classes: background, cell, and edge.

The cells in a call image vary in size, shape, and potentially overlap each other. Commonly used approaches like patch-by-patch scanning method or up-sampling method do not achieve satisfactory result in cell images due to the following three factors: First, cell segmentation requires very accurate boundary shape which is hard to achieve using the up-sampling method. Second, cell images typically have imbalanced class data, in that there are much fewer edge pixels than cell pixels or background pixels. Third, cell images usually contain cells at different scale-levels (i.e. cell sizes) in a single image, which makes performance low when using a network model with a single receptive field size.

To address the above issues, embodiments of the present invention provide an artificial neural network system that combines multiple CNN networks, each network being designed for a particular scale, i.e. designed to process image patches of a particular size.

Patch based classification methods have been described in literature, in which image patches are generated from the original input image, and each patch is fed into a network as input to classify the patch. Patch based methods have the advantage that they can keep more boundary information and produce more accurate boundary shapes. The classification method according to embodiments of the present invention is based on a patch based method, but instead of generating a classification result that classifies the patch, in the present embodiments, each image patch is processed as input to generate a classification result for the pixel located at the center of the patch. Patches are scanned across the entire input image to generate classification result for each pixel of the image. Thus, the classification method of the present embodiments performs pixelwise classification.

Figure 1:
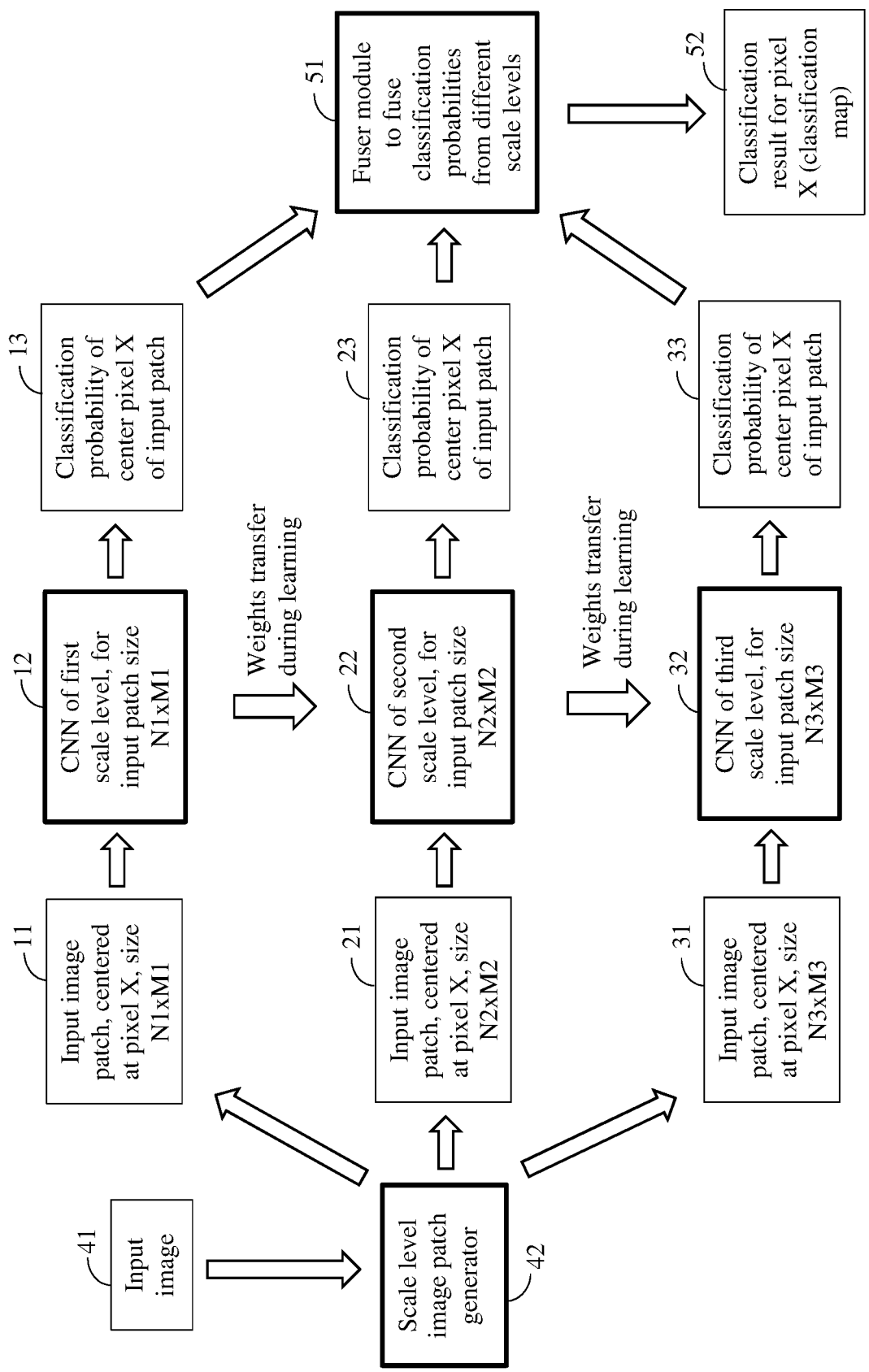
FIG. 1 schematically illustrates the architecture of a multi-scale CNN system according to embodiments of the present invention.

FIG. 1 schematically illustrates the architecture of a multi-scale CNN system according to embodiments of the present invention. As shown in FIG. 1, the multi-scale CNN architecture includes multiple individual CNN networks 12, 22, 32 arranged in parallel. Three individual CNNs are shown in the example of FIG. 1, but other numbers of individual networks may be used. Each individual CNN has a number of convolutional layers and a number of pooling layers, as well as other layers as desired. Each individual CNN is designed for a particular scale (receptive field of view, or FOV) to process image patches of different predefined sizes, such as N1×M1, N2×M2 and N3×M3 pixels in the illustrated example. Each individual CNN 12, 22, 32 takes an image patch 11, 21, 31 of the predefined size as input, and outputs a classification probability 13, 23, 33 of the center pixel of the input image patch.

Figure 4:
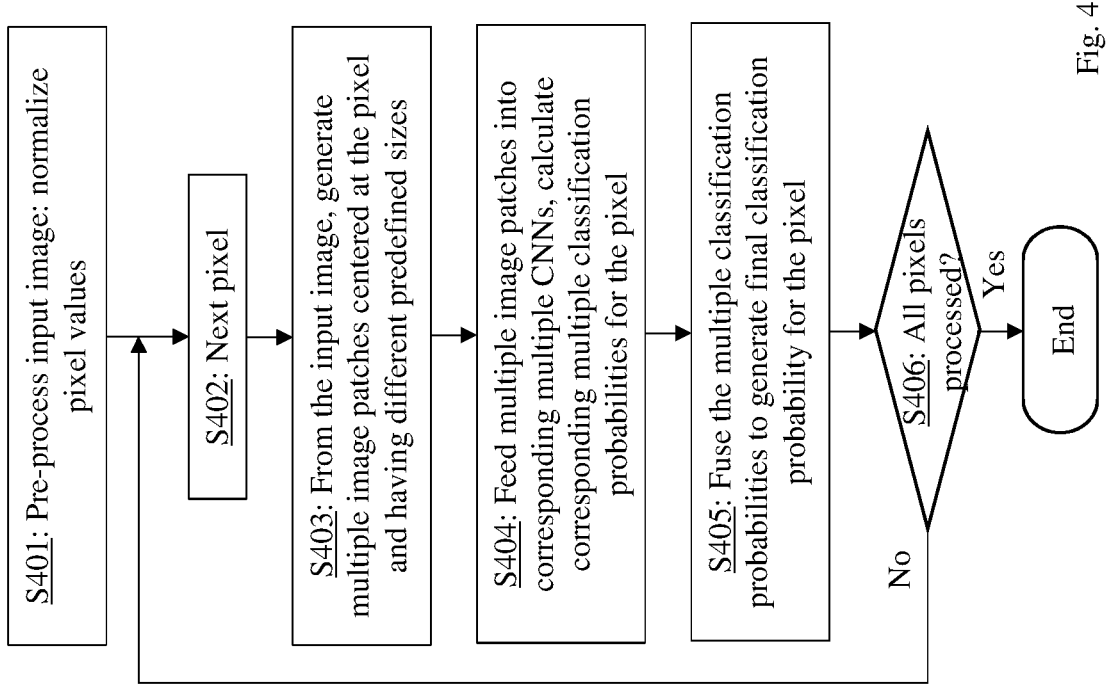
FIG. 4 schematically illustrates a method of pixelwise image classification using the multi-scale CNN system of FIG. 1 according to an embodiment of the present invention.

When performing classification processing of an input image 41 (also referred as the prediction stage), the input image is pre-processed to normalize the pixel values of the images (see FIG. 4, step S401), which will be described in more detail later. Then, for each pixel X of the input image (see FIG. 4, step S402), multiple image patches 11, 21, 31 centered at pixel X are cropped (i.e. without down-sampling) from the input image by a scale level patch generator 42, the image patches having different predefined sizes corresponding to the scale (FOV) of the CNNs, i.e., N1×M1, N2×M2 and N3×M3 (see FIG. 4, step S403). The image patches are fed respectively to the trained individual CNNs 12, 22, 32, which respectively generate multiple classification probabilities 13, 23, 33 for the center pixel X (see FIG. 4, step S404). The classification probability for a pixel generated by each individual CNN is a vector that contains the probabilities (which may be expressed as scores or percentages) of the pixel belonging to each class. The multiple classification probabilities 13, 23, 33 from the multiple individual CNNs are fused together by a fuser module 51 to generate a final classification result 52 for pixel X (see FIG. 4, step S405). The final classification result is again a vector containing the probabilities of pixel X belonging to each class. This process is repeated for each pixel of the input image (see FIG. 4, step S406); the final classification probabilities for all pixels form a final class probability map. Padding may be used when the pixel X is close to the edge of the input image.

During the prediction stage, each of the multiple individual CNNs 12, 22, 32 operate independently in that no intermediate results from any individual network is used by any other individual network.

In one embodiment, fusing is performed, for each pixel, by first multiplying the probabilities for each class calculated by all of the multiple individual CNNs, i.e., $$y_c = \frac{\prod_{i=1}^{n} y_c^i}{255^n}$$

where i is the index of the individual CNNs of different scale levels, n is the number of CNNs, c denotes class (background, cell, boundary), and y' is the pixel-wise class score for class c output by network i (note that here the classification probability is expressed as a class score that ranges from 0 to 255). The product for each class is then normalized over all classes:

$$y'_c = \frac{y_c}{\sum_c y_c}$$

where $y'_c$ is the normalized probability that the pixel belongs to class c.

The multiple individual CNNs 12, 22, 32 may have the same or different configurations. In some embodiments, the multiple individual CNNs all have the same overall configuration in that they have the same number and order of various layers including convolutional layers and pooling layers, the same number of filters and the same filter sizes in the corresponding convolutional layers (except that the filters in the last convolution layer in different networks have different sizes), and the same pooling methods, but the corresponding layers in different individual networks have different heights and widths which are dictated by the sizes of input patches that the individual networks are desired to process, which is the receptive field of view (FOV) in this case.

Figure 2:
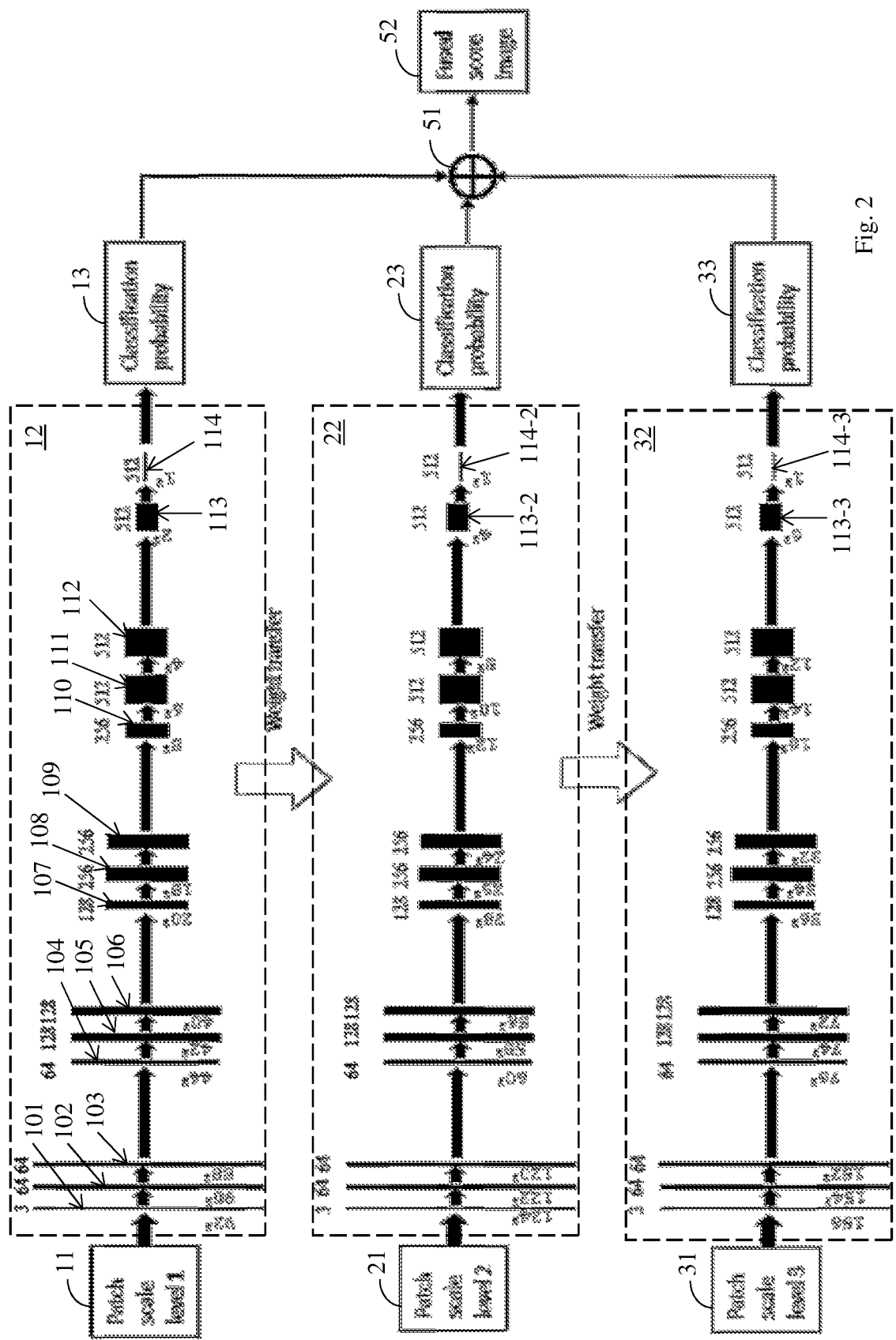
FIG. 2 schematically illustrates the architecture of an exemplary multi-scale CNN system according to an embodiment of the present invention, where each CNN is based on a VGG network model.

In one particular example, shown in FIG. 2, the individual CNNs 12, 22, 32 for the first, second and third scale levels respectively have FOVs of 92×92, 124×124, and 156×156 pixels. Each individual CNN 12, 22, 32 has multiple layers 101-114 stacked sequentially as shown (to avoid overcrowding, only layers for the first CNN 12 are labeled in FIG. 2). Layer 101 is the input layer; it has a depth of 3 which corresponds to the three color channels (e.g. red, green, blue) of the image. Then, two consecutive convolutional layers are followed by a max pooling layer, which is repeated four times. More specifically, layers 102, 103, 105, 106, 108, 109, 111, 112 and 114 are convolutional layers, and layers 104, 107, 110, and 113 are max pooling layers. The depths of the four sets of convolutional layers and pooling layers are 64, 128, 256 and 512, respectively. A last convolutional layer 114 of size 1×1 and depth 512 follows the last max pooling layer 113.

In each convolutional layer, each depth slice convolves a filter across the previous layer and then performs a ReLU (rectified linear unit) operation. In this example, each convolution filter (except in the last convolutional layer 114) has a height×width of 3×3 and the convolution stride is 1 (i.e. the filter is slid laterally by 1 pixel at a time in the convolution). No padding is done, so the height and width of the convolutional layer are smaller than those of the previous layer by 2. The filters in the last convolutional layers 114, 114-2, and 114-3 have a height×width of 2×2, 4×4 and 6×6, respectively, corresponding to the different sizes of their respective previous pooling layers 113, 113-2 and 113-3.

In each max pooling layer, max pooling is performed using a 2×2 window with a stride of 2 (i.e. the window is slid laterally by 2 pixels at a time in the pooling). As a result, the height and width of the max pooling layer are one half of those of the previous convolutional layer.

The heights and widths of the corresponding layers in the different individual CNNs are different as they are related to the receptive FOV of each network.

In FIG. 2, the height and width of each layer are depicted next to the lower part of the layer, such as $92^2$, $90^2$, $88^2$, etc.; the depth of each layer is depicted above the layer, such as 3, 64, 64, etc.

In each individual CNN, after the last convolutional layer 114, a convolution and a softmax operation (a multiclass logistic regression classifier) are applied to the last convolutional layer to output the classification probability of pixel X 13, 23, 33.

Each of the CNNs in the example of FIG. 2 is a modified VGG model, where the last few layers of the VGG model are removed. The VGG model is described in K. Simonyan et al., Very Deep Convolutional Networks For Large-Scale Image Recognition, ICLR 2015 ("K. Simonyan et al. 2015").

Because image patches centered at pixels adjacent to each other have large overlaps, to reduce repeated computation, dilated convolution and dilated pooling may be applied in the convolutional layers and pooling layers, which reduces processing time. Generally speaking, dilated convolution and dilated pooling uses filters that have spaces between cells (i.e. dilation). Dilated convolution technique is described in F. Yu et al., Multi-Scale Context Aggregation By Dilated Convolutions, ICLR 2016. H. Li et al., Highly Efficient Forward and Backward Propagation of Convolutional Neural Networks for Pixelwise Classification, arxiv: 1412.4526, December 2014, describes using dilated convolution and dilated pooling technique to speed up computation for pixelwise classification of images (see Sec. 3.4 and FIGS. 2 and 3 of the paper, where dilated convolution is described in terms of using "regularly sparse kernels").

During the training stage, the multi-scale CNN system is trained by supervised learning to learn the parameters including weights (filters) and biases of the individual CNNs. Each individual CNN is trained separately using a supervised learning algorithm. Generally speaking, a supervised learning algorithm processes labeled training data and produces network parameters that minimize a loss function on the training data through multiple iterations. Any suitable training algorithm may be used to train the individual CNNs; for example, as a training method may adapted from those described in the K. Simonyan et al. 2015 paper.

Since the individual CNNs 12, 22, 32 of different scale levels share the same layer structure except for the last convolutional layer, in a preferred embodiment, the parameters that has been learned by a network of one scale level (except for the weights for the last convolutional layer) are transferred from that network to a network of another scale level as initial parameters, and the other network is trained further using supervised learning. In one embodiment, the parameters are transferred from a low scale level network to its nearest higher scale level network. Thus, in the example of FIG. 2 which contains three CNNs of low to high scale levels, the lowest scale level network 12 is trained first (see FIG. 3, step S303); then the learned parameters from network 12 are transferred to network 22, and using the transferred parameters as initial parameters, network 22 is trained further (see FIG. 3, step S304); the learned parameters are then transferred from network 22 to network 32 as initial parameters and network 32 is trained further (see FIG. 3, steps S305, S304).

In other embodiments, the weight transfer may be from higher scale levels to lower scale levels, or from a middle scale level to successively higher and lower scale levels.

In supervised leaning, the training data used to train the networks include image data and corresponding label data (i.e. the desired classification result) for each image. The label data corresponding to each training image is a map having the same height and width as the training image where each pixel has a pixel value representing the desired classification result for the corresponding pixel of the training image. Training data for various kinds of practical applications have been collected as datasets and made available as various training databases. For cell images, commonly available training data only label image pixels with two classes, namely foreground (cell) and background. As mentioned earlier, however, embodiments of the present invention classify pixels of cell images into three classes: cell, boundary (also referred to as contour or edge), and background. Therefore, in embodiments of the present invention, the available two-class training data is pre-processed to generate a third class of labels for boundary pixels (see FIG. 3, step S301). In one embodiment, an edge detection operation such as the Sobel filter is applied to the training image to detect edges. The labels for pixels in the detected edges are changed to the boundary label, so the label data now has three classes.

Figure 3:
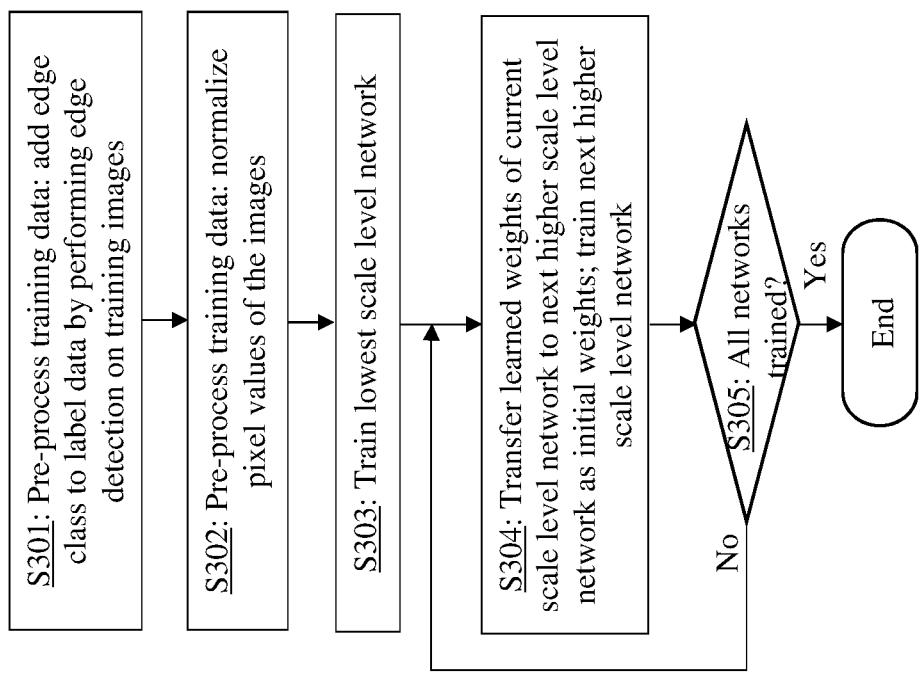
FIG. 3 schematically illustrates a method of training the multi-scale CNN system of FIG. 1 according to an embodiment of the present invention.

Also, prior to feeding the training data to the networks, the training images are pre-processed to normalize the pixel values of the images (see FIG. 3, step S302). This step uses the same algorithm as the normalization step S401 during the prediction process. In one example, normalization for both step S302 and step S401 is done using the mean and standard deviation:

$$I'^i = \frac{I^i - \mu}{\sigma}, i = 1 \ldots m$$

where i is the pixel index, $I^i$ is the pixel value of the original input image and $I'^i$ is the normalized pixel value, and $\mu$ and $\sigma$ are respectively the mean and standard deviation of the pixel values of the original image. The normalization is performed for each color channel (e.g. R, G, B channels) separately with separate mean and standard deviation for each channel.

To properly train the networks, it is desirable that the training data contain sufficient samples of each class. In typical sample cell images, however, there are often far fewer boundary pixels than foreground or background pixels. To address the issue of class data imbalance in training images, embodiments of the present invention use a sampling method to select image patches as training input in order to ensure that the training data contains adequate numbers of samples for each class.

To do this, a pixel list is maintained for each class; each pixel list contains the pixel indices of all pixels in the training dataset that belong to that class. The pixel index is a one-dimensional positional index of pixel in all training images of the dataset, the index running sequentially within each image and sequentially for all images of the training dataset. The pixel indices of all pixel belonging to each class are collected in a list, and the list is shuffled. FIG. 5 schematically illustrates exemplary pixel lists for edge (i.e. boundary), cell, and background. For each iteration of the training process, a predetermined number of pixels are selected sequentially from each pixel list. Preferably, the same number of pixels are selected from each list. Corresponding image patches centered at the selected pixels are generated from the input image and used as training data for one iteration. For the next iteration, the next predetermined number of pixels are selected sequentially from each pixel list. This process is repeated. When the end of a pixel list is reached, the list re-shuffled and the pixel selection continues to the start of the new list. Using this method, each class is forced to have similar or the same number of image patches fed into the network for training.

The inventors constructed a multi-scale CNN system containing two scale levels using GPU cluster hardware technology. The FOV of the two scale levels are 124×124 and 156×156, respectively, and the configuration of the two individual CNNs are the same as CNNs 22 and 32 shown in FIG. 2. Experimental results show that this two-scale CNN system achieves better results than each of the individual CNNs.

Two examples of cell image classification results using this two-scale CNN system are shown in FIGS. 6(a)-6(e) and 7(a)-7(e). FIG. 6(a) shows the original input image of the first example. FIGS. 6(b) and 6(c) show the output probability map of the 124×124 and 156×156 CNNs, respectively, and FIG. 6(d) shows the probability map of the fused result. FIG. 6(e) is the ground truth, i.e. the desired classification result. FIGS. 7(a)-7(e) are the respective images or maps for the second example. In FIGS. 6(b)-6(d) and 7(b)-7(d), the background, edge, and cell probability values are show in the maps with the blue, green and red channels, respectively, for convenient visualization. It can be seen from these examples that the fused results are qualitatively better than the result obtained from individual networks for particular scales. Some separated segments caused by a small scale input are connected after fusing of the result from the two individual networks.

Figure 8:
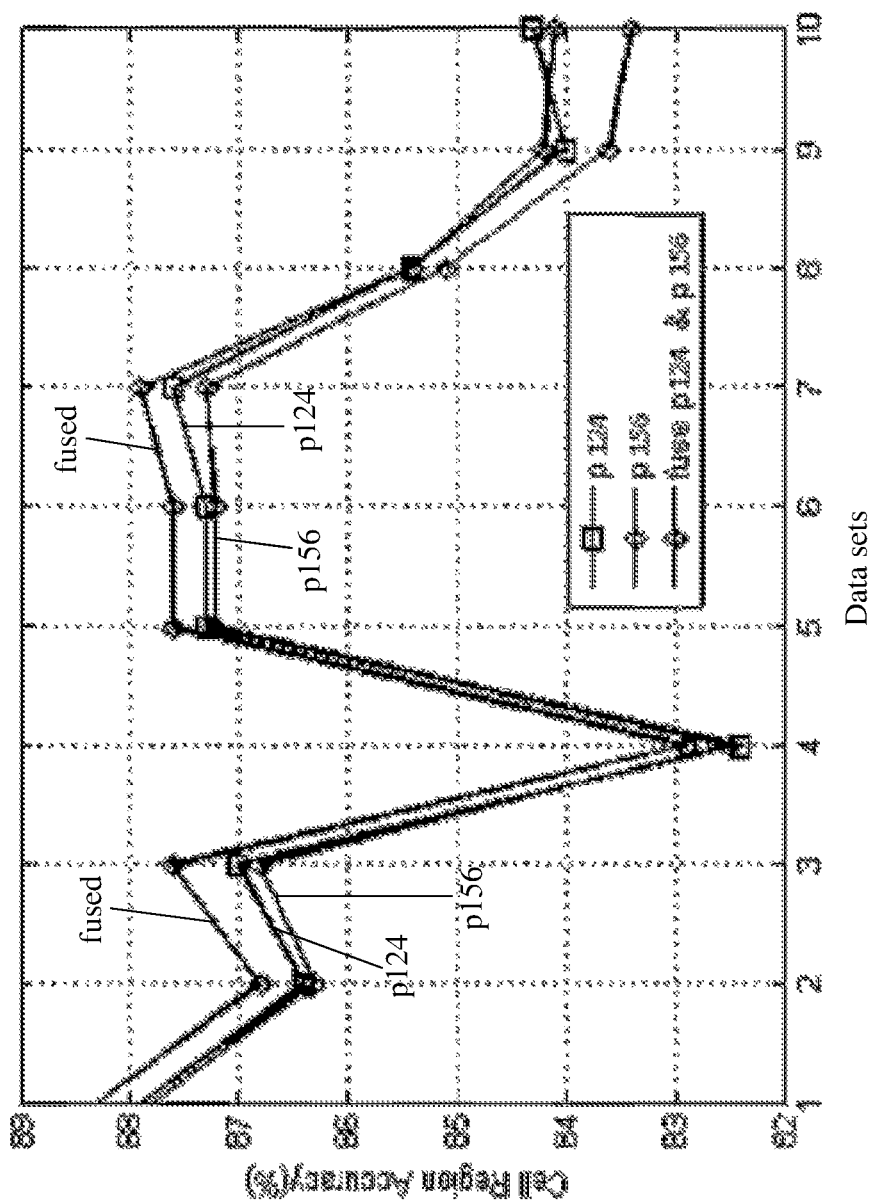

Further, the above two-scale CNN system was evaluated using ten data sets of cell images. Label data for the images were used to evaluate accuracy of the prediction results. The ten data sets contained 100 cell images which were divided into ten sets based on image intensity, the density of cell overlapping, etc. so they have various degrees of difficulty. The results are shown in FIG. 8. It can be seen that for all data sets except for the tenth, the fused results are significantly improved as compared to results from either of the individual CNNs.

To summarize, the multi-scale CNN system and method in the above embodiments combine prediction results from independent networks of different scale levels to solve multi-scale issues in cell image segmentation. A larger field of view (FOV) usually has good performance for large cells while a smaller FOV keeps more detail information. For cell images that contain cells of different scale levels in a single image, using a multi-scale CNN system having multiple CNNs of different FOVs can extract and learn different scales of image features, thereby achieving superior result. The ability to classify images containing different sizes of cells is an important benefit for pathological analysis.

Because the different scales of networks are independent of each other, the system can be easily expanded to larger ranges of scale levels to handle new scales in input images, by adding more individual networks, without the need to re-train the existing networks.

The parallel design of multi-scale networks allows it to use GPU parallelization technology to speed up processing.

The architecture of the multi-scale CNN system allows parameters transfer from an already trained network to another network during training, which speeds up training.

The method adopts a patch based classification method but uses it to perform pixelwise classification of cell images. The classification process predicts the class of the center pixel by learning the structure around the center pixel. To take advantage of the large overlap of image patches, dilated convolution and dilated pooling operations are used in the individual CNNs to reduce repeated computation.

Further, the method is "edge aware", as it includes edge pixels as a class along with foreground (cell) and background. Conventional cell detection methods typically use only two classes, namely background and foreground. Some network models separately train for edge, but they include only edge and background classes, rather than three classes. Such an edge aware system is particular effective for dense object segmentation such as for cell images.

During training, a sampling method is used to generate input patches from the original input images to ensure that training data is balanced among all classes.

The multi-scale CNN system described above can be implemented on a computer system which includes processors and memories storing computer executable programs. Each of the components of the system of FIG. 1, including the scale level image patch generator 42, the individual CNNs 12, 22 and 32, and the fuser module 51 may be implemented by computer programs executed by processors. Because of the parallel design of the different scale levels of networks, the system can be implemented to utilize parallelization technology such as a GPU cluster machine. The system design is particularly suitable for using a cluster of GPUs, including the latest GPU hardware technology, e.g., Nvidia DGX-1.

It will be apparent to those skilled in the art that various modification and variations can be made in the multi-scale CNN system and related method of the present invention without departing from the spirit or scope of the invention. Thus, it is intended that the present invention cover modifications and variations that come within the scope of the appended claims and their equivalents.

What is claimed is:

1. An artificial neural network system implemented on a computer for image classification, comprising:

N individual convolutional neural networks (CNNs), N being a natural number greater than or equal to two, each individual CNN having a plurality of layers of neurons stacked sequentially, including at least a plurality of convolutional layers and a plurality of pooling layers, each convolutional layer performing convolution operations to convolve a number of filters across its previous layer, each pooling layer performing pooling operations on its previous layer, wherein each of the N individual CNNs is configured to process an input image patch to calculate a classification result representing a classification of a center pixel located at a center of the input image patch, each of the N individual CNNs defining a receptive field of view (FOV) which is equal to a size of input image patches to be processed by the individual CNN, the FOV of different individual CNNs being different from each other;

a scale level image patch generator for generating N input image patches by cropping the image patches from an input image, the N image patches being centered at a common center pixel of the input image and having respective sizes equal to the FOV of the N individual CNNs, wherein each of the N individual CNNs is coupled to the scale level image patch generator to receive a respective one of the N input image patches, without receiving any information from other ones of the N individual CNNs, and is configured to process the received input image patch to calculate a respective classification result for the center pixel; and a fuser module coupled to the N individual CNNs, for calculating a final classification result for the center pixel by combining the classification results from the N individual CNNs without using any other input.

2. The artificial neural network system of claim 1, wherein the N individual CNNs have identical numbers and identical arrangements of the convolutional layers and the pooling layers, wherein the corresponding layers of different individual CNNs have different heights and widths and have identical depths, and wherein the filters in corresponding convolutional layers of the different individual CNNs except for a last convolutional layer in each CNN have identical heights and widths.

3. The artificial neural network system of claim 1, wherein the different individual CNNs are independent of each other.

4. The artificial neural network system of claim 1, wherein the filters in all of the plurality of convolutional layers except for a last convolutional layer in each of the N individual CNNs have a height of 3 and a width of 3.

5. The artificial neural network system of claim 1, wherein the classification result calculated by each individual CNN is a vector having M values, each value representing a probability of the center pixel belonging to a corresponding one of M classes, M being a natural number equal to or greater than two, and wherein the fuser module calculates the final classification result by multiplying, for each class, the probabilities calculated by all of the individual CNNs, and normalizing products of the multiplications over the M classes, to generate M values representing final probabilities of the center pixel belonging to a corresponding one of the M classes.

6. The artificial neural network system of claim 5, wherein M is equal to three, wherein the three classes include a background class, a foreground class and an edge class.

7. An image classification method using an artificial neural network system implemented on a computer, comprising:

providing N individual convolutional neural networks (CNNs), N being a natural number greater than or equal to two, each individual CNN having a plurality of layers of neurons stacked sequentially, including at least a plurality of convolutional layers and a plurality of pooling layers, each convolutional layer performing convolution operations to convolve a number of filters across its previous layer, each pooling layer performing pooling operations on its previous layer, each of the N individual CNNs defining a receptive field of view (FOV), the FOV of different individual CNNs being different from each other;

for each pixel X of an input image:
cropping N image patches from the input image centered at the pixel X, each of the N image patches having a size equal to the FOV of a corresponding one of the N individual CNNs;

inputting the N image patches respectively into the corresponding N individual CNNs;

each individual CNN, without receiving any information from other ones of the N individual CNNs, processing the respective inputted image patch to calculate a respective classification result for the pixel X; and calculating a final classification result for the pixel X by combining the classification results from the N individual CNNs without using any other input.

8. The image classification method of claim 7, wherein the N individual CNNs have identical numbers and identical arrangements of the convolutional layers and the pooling layers, and wherein the corresponding layers of the different individual CNNs have different heights and widths and have identical depths, and wherein the filters in corresponding convolutional layers of the different individual CNNs except for a last convolutional layer in each CNN have identical heights and widths.

9. The image classification method of claim 7, wherein layers in different individual CNNs are independent of each other.

10. The image classification method of claim 7, wherein the filters in all of the plurality of convolutional layers except for a last convolutional layer in each of the N individual CNNs have a height of 3 and a width of 3.

11. The image classification method of claim 7, wherein the classification result calculated by each individual CNN is a vector having M values, each value representing a probability of the center pixel belonging to a corresponding one of M classes, M being a natural number equal to or greater than two, and wherein the step of calculating a final classification result includes:
multiplying, for each class, the probabilities calculated by all of the individual CNNs; and
normalizing products of the multiplications over the M classes, to generate M values representing final probabilities of the center pixel belonging to a corresponding one of the M classes.

12. The image classification method of claim 11, wherein M is equal to three, wherein the three classes include a background class, a foreground class and an edge class.

13. The image classification method of claim 7, further comprising:
generating a classification map using the final classification results for all pixels of the input image.

14. A method of training an artificial neural network system for image classification, the artificial neural network system being implemented on a computer and including N individual convolutional neural networks (CNNs), N being a natural number greater than or equal to two, each individual CNN having a plurality of layers of neurons stacked sequentially, including at least a plurality of convolutional layers and a plurality of pooling layers, each convolutional layer performing convolution operations to convolve a number of filters across its previous layer, each pooling layer performing pooling operations on its previous layer, each individual CNN has a first portion, wherein the first portions of the N individual CNNs have identical numbers and identical arrangements of the convolutional layers and the pooling layers, wherein the corresponding layers in the first portions of different individual CNNs have different heights and widths and have identical depths, and wherein the filters in corresponding convolutional layers in the first portions of the different individual CNNs have identical heights and widths, the training method comprising:
training a first CNN of the N individual CNNs using labeled training images to obtain a set of parameters for the first CNN, the set of parameters including a subset of parameters for the first portion of the first CNN;
transferring the subset of parameters for the first portion of the first CNN to the first portion of a second CNN of the N individual CNNs; and
training the second CNN using labeled training images and using the transferred subset of parameters as initial parameters, to obtain a set of parameters for the second CNN.

15. The method of claim 14, wherein each layer of the first portion of the first CNN has a height and a width that are respectively smaller than a height and a width of a corresponding layer of the first portion of the second CNN.

* * * * *